3,101,133
SAFETY BRAKE MECHANISM

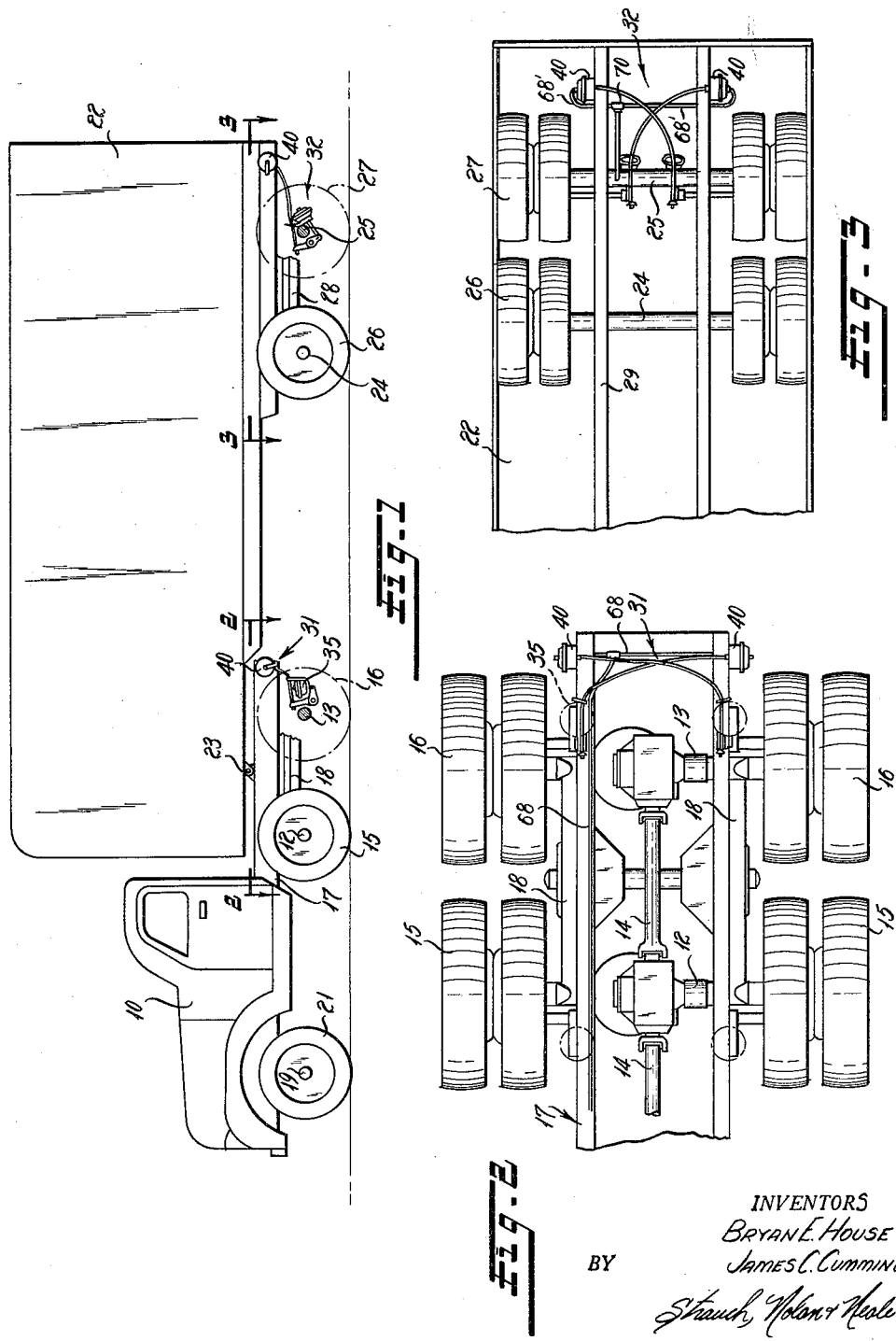

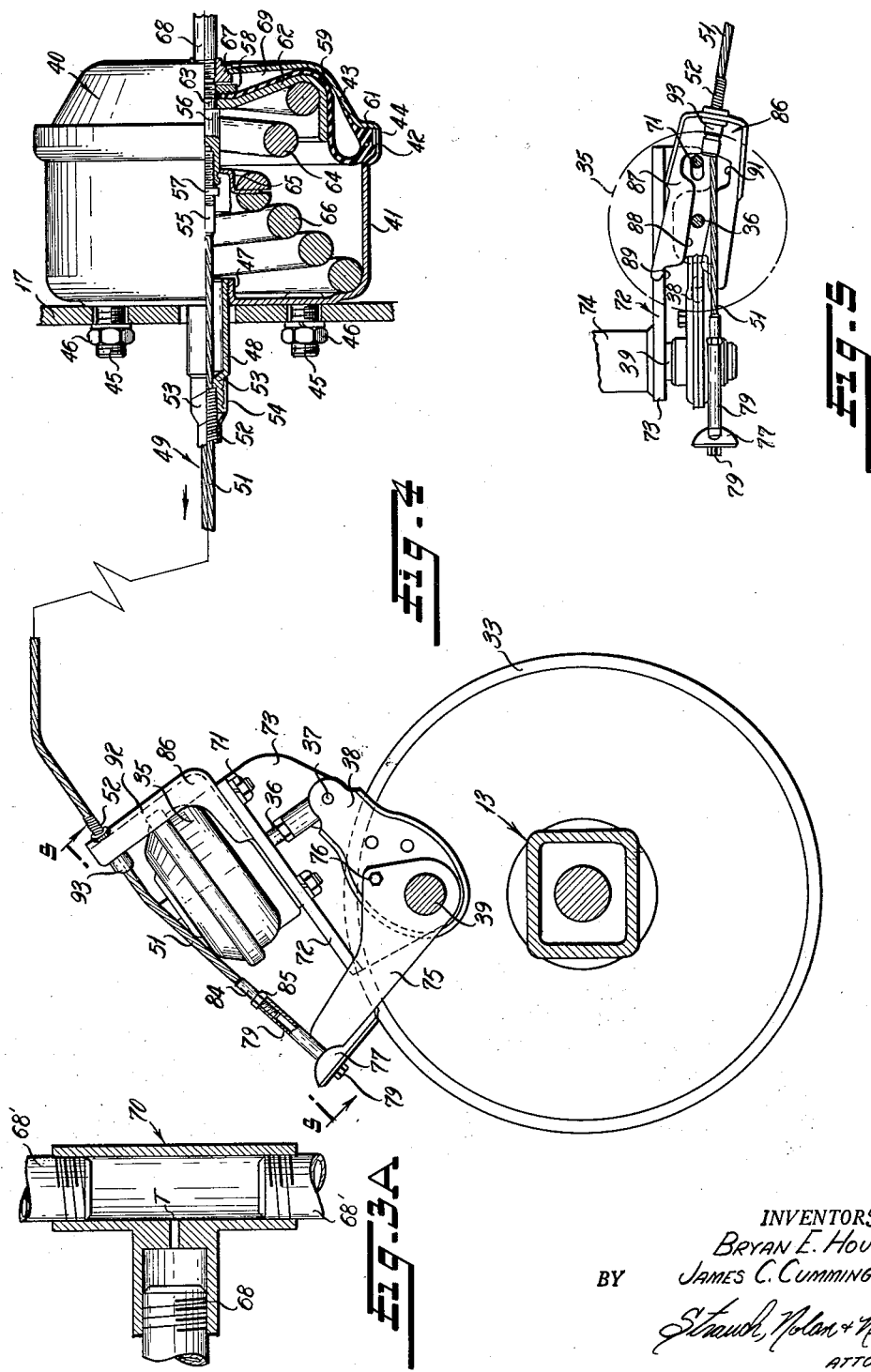

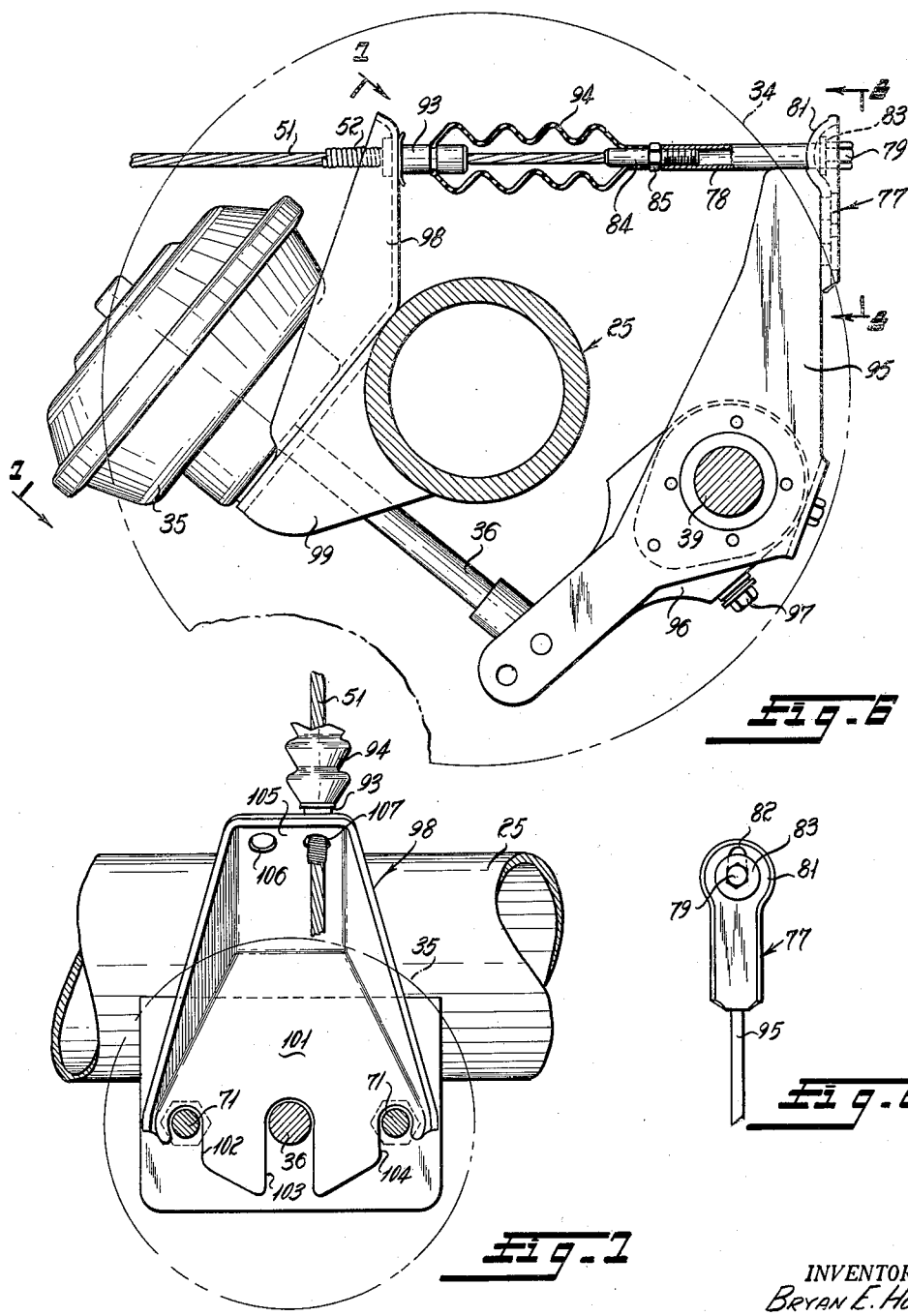

Bryan E. House, Birmingham, and James C. Cumming, Detroit, Mich., assignors to Rockwell-Standard Corporation, Coraopolis, Pa., a corporation of Pennsylvania
Filed Nov. 21, 1958, Ser. No. 775,617
2 Claims. (Cl. 188—170)

The present invention refers to braking mechanism for automotive vehicles and more specifically to an emergency braking system thereof.

Several prior attempts have been made to provide an emergency brake for automotive vehicles to prevent the runaway of vehicles when the vehicle service brakes should fail due to faulty brake mechanisms, breakage in fluid power lines or some other reason, circumstances which become extremely dangerous when brake failure occurs without warning on a road grade or when the operator must bring the vehicle to a sudden stop.

Most prior emergency brakes were insufficient in some way or the other as, for instance, they could only be applied to trailer axles or they were too bulky and consisting of too many vulnerable parts. In other instances considerable and expensive changes on the tractor or trailer chassis were necessary to install them. Some of them were too expensive and therefore uneconomical as to justify their installation. Others again were actuated by electrical operators (switches, solenoids, etc.) which required considerable attention and maintenance and which, of course, would not work in case of simultaneous failure in the electrical system. Still others operated directly on the service fluid brake systems through a complex arrangement of multiple valves, which would apply the brakes when fluid pressure in the emergency lines dropped below a preset value. Although those latter systems are usually workable they do not in every case provide efficient braking power because they operate only on the air or other fluid supply left in the fluid reservoir.

Many of those prior emergency brake devices were nothing but auxiliary brakes, which could be applied in case the service brake broke down, in other words, they would not be applied automatically when the service brakes were defective, and there was no means to let the operator of a vehicle know in advance that his service brakes are not working. Still others which acted on the camshaft lever of the service brakes could not be applied in emergencies when the brakes were out of adjustment, necessitating a larger stroke from the brake chamber.

The invention provides a safety brake system which can be incorporated on trailer, tractor, truck, or bus axles, single or tandem, and driving or non-driving axles without the necessities of appreciable modification on the vehicle, and which can be easily assembled to any existing rolling equipment presently operating and equipped with air brakes for example. The invention also provides a safety brake which is economical and efficient, and which rapidly automatically applies the brakes whenever a failure in the service brake power system occurs, thus making it not only an auxiliary emergency brake, but a fail safe unit which will tell the operator of the vehicle at once when his service brakes are not in order so that the damaged service brakes can be repaired at once, which will be in most instances prior to a real emergency. Furthermore, such safety brakes have to comply with all existing state and I.C.C. regulations and taking every aspect into account, it has been found that none of the former proposed safety brake systems meet all requirements.

In carrying out the preferred embodiment of the present invention, installation is made to connect to the usual air actuated service brakes of a motor vehicle or trailer a safety brake unit by means of a flexible cable and conduit connected to a compression spring which is normally biased to apply the brakes but which is held in compression by an additional air actuated chamber connected to the same air reservoir as the service brakes, thereby making it impossible for the compression spring to normally apply the brakes. However, if there should be a failure or more likely a leakage in the service brake system which is apt to decrease the air pressure in the lines below a preset value, the safety unit will apply the brakes automatically and at the same rate as the air pressure decreases; that is, slowly, when there is a small leak, or with a full force, when there is an abrupt failure. In case of a gradual decreasing of the air pressure in the braking system because of a slow leak the brakes in such instances will also be gradually applied, signalling to the operator of the vehicle at once that his service brakes are not in order and normally cause him to stop to investigate and repair the damage before a real emergency occurs, thereby probably preventing a possible serious accident. Suitable associated indicators or warning lights may be incorporated to reduce wear.

Accordingly, it is a major object of the present invention to provide in a fluid pressure (such as air) actuated brake systems for motor vehicles, trailers and the like a safety brake mechanism connected to the service brake system and normally held inoperable by the fluid pressure of the system.

A further object of the invention is to provide a novel emergency safety brake system for vehicles having service air brakes wherein a flexible cable and conduit connected to the brake mechanism at the wheel is connected to a compression spring normally biased to apply the brakes but held compressed and prevented from applying the brakes by the air pressure in the brake system.

Another object of the present invention is the provision of a safety brake unit composed of a sealed air cylinder containing a compression spring to which is attached a flexible cable and conduit the other end of which is attached to service brake operating mechanism, and the compression spring being held compressed by the existing air pressure condition in the system, but which is actuated to apply the brakes automatically when the air pressure falls below a preset value.

Still another object of the present invention is to provide in a safety brake mechanism for motor vehicles a single, self-contained, completely sealed unit which can be easily attached to any place on the chassis of the vehicle so as not to interfere with axle components and is equipped with a flexible cable and conduit for attachment to the service brake operating mechanism.

A further object of the present invention is the provision of a safety brake mechanism which can be equally well installed on dead axles, drive axles, single or tandem, and without excessive modifications thereof or on the vehicle, and which does not need additional valves but is hooked-up directly to the compressed air reservoir or high pressure line of the vehicle.

Other numerous objects and features will become evident from the following description taken in connection with the attached drawings which show perferred embodiments of the present invention and in which:

FIGURE 1 is a side elevation showing a conventional trailer-tractor vehicle combination embodying the present invention;

FIGURE 2 is a top plan view of the tractor tandem axle of FIGURE 1 looking along line 2—2, on a larger scale showing the application of the safety unit to one axle;

FIGURE 3 is a top plan view of the trailer axle tandem unit of FIGURE 1 looking along line 3—3, on a larger scale, showing the application of the safety unit to one axle only;

FIGURE 3A is a fragmentary section showing the restrictive orifice in the air pressure supply line;

FIGURE 4 is a side elevation partially diagrammatic and partly sectioned showing on a larger scale the complete safety unit as attached to a drive axle with the safety chamber separate from its support on the chassis for clarity of disclosure;

FIGURE 5 is a top plan view of the safety unit bracket and cable attachment with the service air chamber being omitted and looking along line 5—5 of FIGURE 4;

FIGURE 6 is an enlarged end elevation partly in section showing the safety unit cable and bracket attachment to a non-drive axle;

FIGURE 7 is a plan view of the safety unit bracket of FIGURE 6, with the service air chamber omitted for clarity purposes, as seen along line 7—7 of FIGURE 6; and FIGURE 8 is an end view of the cable attachment looking along line 8—8 of FIGURE 6.

The same numerals refer to the same parts throughout the description.

Referring now to FIGURE 1 there is illustrated a conventional tractor-trailer combination to which the present invention may be applied although it could be equally well applied to trucks, buses, etc., the tractor-trailer combination being chosen for illustrating purposes only. The tractor unit 10 contains a power plant (not shown) operably connected to drive tandem axles 12 and 13 through a propeller shaft 14. The opposite ends of axles 12 and 13 are supported by ground engaging wheels 15 and 16 respectively, and the axles are connected to the chassis 17 by suitable spring suspensions 18.

The forward end of tractor chassis 17 is supported by suitable springs on an axle 19 having dirigible ground engaging wheels 21 for steering the vehicle.

Tractor 10 usually tows a trailer 22 which is supported on the tractor chassis by a conventional fifth wheel arrangement 23, the details of which are not illustrated. The rear end of trailer 22 is supported by a tandem axle assembly composed of non-driving axles 24 and 25 supported at their outer ends by ground engaging wheels 26 and 27 and connected by spring suspensions 28 to the chassis 29 of the trailer. The driving and suspension components of the tractor-trailer unit are conventional and need not be described here in detail as such detail has no bearing on the present invention. It will be furthermore understood that both the tractor 10 and trailer 22 may comprise single axles instead of tandem axles.

With reference to FIGURES 2 and 3, safety units are illustrated at 31 and 32 as applied to the rearmost axles of the respective tandem axle assemblies. The wheels on the respective axles embody conventional brake mechanism details of which are not shown, the respective brake drums 33 and 34 being indicated in FIGURES 4 and 6. Drum 33 in FIGURE 4 is rigid with wheel 15 or 16 otherwise not illustrated there. The vehicle brakes are operated by air actuators 35, one at each wheel, and which are connected by supply conduits (not shown) to a compressed air reservoir (not shown) through a control valve (not shown) usually constructed as a foot operated valve in the driver's compartment of the tractor to enable the driver to apply the brakes by admitting air to the service units at 35 which reciprocates a piston rod 36 (FIGURE 4) pivotally connected at 37 to a lever 38 fixed on brake camshaft 39 which rotates a cam (not shown) within the brake mechanism to spread opposite brake shoes (not shown) against the rotating brake drum 33, all such being well known and conventional. Lever 38 may be the usual slack adjuster lever as illustrated in FIGURE 6 or self-adjusting lever as in FIGURE 4. It should be emphasized here that the present invention may be applied to other than cam actuated brakes (as for instance: wedge actuated, disk brakes, etc.) with but minor modifications for the safety brake attachment on the actuating end.

The air brake system of such vehicle operates under a certain predetermined pressure which may vary according to the type and service conditions of the vehicle. If somewhere along the brake system a leak should occur, which happens rather frequently, the pressure in the system drops and the brakes cannot be applied efficiently, or in severe cases the brakes cannot be applied at all, which may result in serious accidents. To overcome this vulnerable condition of such a fluid operated brake system the invention provides a spring loaded brake operating safety unit 40 in addition to the fluid operated service brake unit at each wheel.

FIGURES 4 and 5 show the application of this safety unit 40 to live (tractor) axles, and FIGURES 6 to 8 show application to a dead (trailer) axle.

With reference to FIGURE 4, each safety unit 40 is composed of an air-tight chamber consisting of a base cup 41 having a rim 42 and a cover cup 43 having a flange 44 crimped as shown or secured by other suitable means around rim 42 to provide an air-tight seal. The bottom of cup 41 is provided with two rigid stud assemblies 45 that project through apertures in the side rails of chassis 17 to receive nuts 46 that when tightened attach the safety unit to the chassis of the vehicle as shown in FIGURES 1 to 3.

The bottom of cup 41 is furthermore provided with an aperture rimmed by an inturned flange 47 which is internally screw threaded to receive a cylindrical adapter sleeve 48 that rigidly projects from the actuator housing.

A cable 49 extends between safety unit 40 and the associated service unit 35 and is made up of three parts, of which only the innermost part 51, which is a flexible wound strand wire, is reciprocably movable. Wire 51 is surrounded by a close coiled flexible spring 52 which is secured at one end within the recessed end of sleeve 48 abutting against an internal flange 53 thereof which arrests spring 52 against movement in that direction. Spring 52 is in turn surrounded by a flexible covering 53 for sealing purposes which is at one end securely attached at 54 to the outside of sleeve 48.

Wire 51 extends into cup 41 and is provided at its end with a fitting 55 which is secured to one end of a piston rod 56 and adjustably tightened by a jam nut 57. Piston rod 56 is reciprocably movable and is secured at its other end by a staked nut 58 to a flexible diaphragm 59. Diaphragm 59 is of the roll type, that is, its outer walls roll along the inner walls of the air chamber defined by cup 41 when actuated and the circumferential outer end 61 of the diaphragm is peripherally secured tightly between the crimped flange and rim regions of the cups. Adjacent diaphragm 59 and covered by the latter a large rigid metal cup 62 is secured on a shoulder 63 of the piston rod by nut 58 and with its opening facing towards housing cup 41. Diaphragm cup 62 retains the larger end of a strong cone-shaped coil spring 64, the vertex of the cone being retained by the flange of another smaller cup-shaped annular member 65 through which piston rod 56 extends and which is reciprocably movable relative to the piston rod.

Against the opposite end of the flange of cup member 65 abuts the vertex end of another strong cone-shaped coil spring 66 the larger end of which rests upon the bottom of cup 41. Springs 64 and 66 are so constructed and arranged as to telescope within themselves when compressed, as is the case when the diaphragm cup 62 is moved to the left in the cups. A hollow fitting 67 is provided in the wall of cup 43 for connecting a conduit 68 leading to the compressed air reservoir (not shown). Air under pressure extends chamber 69 and shifts the entire diaphragm assembly to the left a considerable distance within the unit 40. This is the condition of normal vehicle operation wherein wire 51 is moved in the direction of the arrow in FIGURE 4 to slack position. FIG- URE 4 shows the safety chamber 40 in brake applied condition as will appear.

As shown in FIGURES 3 and 3A compressed air supply conduit 68 enters a T-connection 70 from which branch conduits 68' extend to units 40, and a restricted orifice T is provided in the line. The function of orifice T is to avoid the hazard of a too sudden application of the vehicle brakes when a leak develops in that the pressure loss in the unit 40 is slow and permits the springs to pull wire 51 to apply the brakes only gradually.

Each service unit 35 is secured by stud and nut assemblies 71 (FIGURE 4) to a conventional brake chamber support bracket 72 which has a flange 73 welded or otherwise secured to the stationary tube 74 surrounding camshaft 39 (FIGURE 5). Tube 74 is suitably mounted on the axle housing. A lever 75 (FIGURE 4) is mounted on camshaft 39 and secured by a bolt 76 to lever 38 at a predetermined angular relation. Lever 75 is provided at its outer end with a staked on cable securing bracket 77 (FIGURE 8), which receives the end of a sleeve nut 79. The cable securing bracket 77 has a semi-spherical shell-like extrusion 81 provided with a slot 82 through which sleeve nut 79 extends, and which allows lever 77 to slide along sleeve nut 79 in one direction, the other direction being blocked by flange 83 on sleeve nut 79.

Threaded into the other end of sleeve nut 79 is a fitting 84 which is fastened to the other end of wire 51 and adjustably secured to sleeve nut 79 by a jam nut 85. Wire 51 extends across and above the service brake actuator 35 and through a cable retaining bracket 86 which is secured between brake actuator 35 and bracket 72. When retaining nuts at 71 are loosened the bracket 86 may be slipped between unit 35 and bracket 72 and there clamped in place by tightening nuts 71. The base 87 of cable retaining bracket 86 is provided with a longitudinal slot 88 to clear the studs 71 and piston rod 36. Slot 88 is widened at 89 at the outer end and at 91 at the inner end to provide for a slight angular displacement of the bracket as shown in FIGURE 5, in order to accommodate to the associated safety unit position on the vehicle.

Cable retaining bracket 86 has an upstanding flange 92 on which is fixed a hollow cylindrical fitting 93 through which wire 51 slidably extends. Coil spring 52 abuts the end of fitting 93 and is therefore securely longitudinally retained between bracket 86 and sleeve 48 of safety unit 40. If desired the exposed section of wire 51 between fitting 93 and sleeve nut 79 may be protected against dirt and moisture by a flexible rubber sleeve 94 as illustrated in FIGURES 6 and 7. Longitudinal adjustment of the cable can be made by screwing fitting 84 in or out of sleeve nut 79 by rotating the sleeve nut 79.

In case there is a severe leak in the air system of the service brakes, and the wheel brakes have been applied by the safety units 40, there is, of course, no way of releasing the brakes again by admitting air into the chambers of unit 40 prior to repairing the leak. In most cases it will be necessary to get the vehicle off the highway right away for safety, and in that instance the brakes can be easily manually released by loosening the jam nut 85 and unscrewing sleeve nut 79 until the wire 51 is slack.

FIGURES 6 and 7 show another embodiment of the service brake attachment end of the safety brake unit as applied to a dead (trailer) axle. In this instance, the lever 95 is attached to a conventional slack adjuster lever 96 such as disclosed in the copending application of House Serial No. 361,211 filed June 12, 1953 now issued as U.S. Letters Patent No. 2,922,317 dated January 26, 1960 and comprises a bell-crank type lever which is secured to the camshaft 39 and lever 96 as by a cap screw 97 and extends furthermore, along the arm of lever 96 to be secured to the piston rod 36 of service brake actuator 35. The modified cable retaining bracket 98 in this instance is secured in the same manner as before described between the service brake actuator 35 and an actuator bracket 99 welded to axle 25. The base 101 of bracket 98 (FIGURE 7) provides three aligned slots 102, 103 and 104 to clear respective studs like those at 71 of FIGURE 4 and piston rod 36 of service brake actuator 35. The rear upstanding flange 105 of the bracket provides two apertures 106 and 107 for the securing of fitting 93 in either one of them according to the position of the safety chamber 40. Cable 51 then extends through fitting 93 and is secured at bracket 77 of safety lever 95 in the same manner as to lever 75 of FIGURE 4.

In operation: The pressure in an air actuated vehicle brake system has a minimum predetermined working p.s.i. value under which the service brakes can be effectively applied. If this operating fluid pressure drops below its minimum p.s.i. because of a leakage or other reasons, the service brakes cannot be applied efficiently or cannot be applied at all in order to stop the vehicle. In such instance the safety system of the invention acts automatically to apply the service brakes. The same minimum operating pressure of the service brake system is available to hold the spring means 64, 66, in the safety chamber at 40 compressed. When this pressure drops below minimum, the springs 64 and 66 expand and by means of cup 62, which is attached to piston rod 56, which in turn is attached to the cable 51, tighten cable 51 and through medium of lever 75 (or 95) rotate the respective cam shafts and thereby apply the service brakes. When the air pressure is built up in unit 40 the safety system is held inoperative.

Under normal service conditions, the brakes will be applied through the service system in which case the levers 75 or 95 follow the rotation of the respective service levers 38 or 96 without interference by the cable 51, achieved by the provided slot 82 in the cable securing bracket 77 which allows the levers 75 or 95 to slide along the sleeve nut 79.

There is thus provided a fail-safety brake system which is easily adaptable to existing equipment and to any type of conventional or automatic slack adjuster, and which is equally applicable, to trucks, buses, tractors, trailers, etc. and to any type of standard drive axles, tandems or dead axles without interference and without major changes, requiring only three holes to drill on the chassis to mount the safety chambers.

The present invention comprises a self-contained economical safety unit which meets all legal requirements and limitations. The safety chamber is completely sealed and contains within a strong compression spring. There are no additional valves required although, as stated before, this unit could also be used as a parking brake or as an additional brake when descending a steep hill, by incorporating a dump valve.

The use of cable and conduits 49 from the safety chambers to the service brake levers prevents the introduction of additional stresses on the camshaft or imposed load on the camshaft bracket and also compensates by its flexibility for axle movement.

This flexibility of the safety brake actuating mechanism provides furthermore, the use of standard tubing to connect the safety chambers with the fluid reservoir, instead of additional flexible fluid hoses, which may be quite conveniently mounted along the vehicle chassis as indicated at 68 in FIGURES 2 and 3 and without interference with other axle components.

A vehicle having this safety brake system cannot be moved without the required pressure being present in the service air system because the compression springs in the safety chamber have to be compressed in order to release the brakes.

A peculiar advantage of the invention appears in connection with the circumstances of a trailer breaking away from the tractor. In such instance the line 68 will be ruptured and the units 40 become effective as a dead man stop to bring the otherwise free trailer to a halt.

The present invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In an automatic safety braking system for a vehicle having an axle supported by ground engaging wheels and equipped with a source of fluid pressure, a service brake mechanism at a vehicle wheel adapted to be controlled by the driver in normal vehicle operation comprising a brake assembly having a rotatable actuator shaft, support means mounting a fluid pressure motor on the axle adjacent said wheel, and means operatively connecting said motor with said actuator shaft, means for automatically operating said service brake mechanism to apply the service brakes to decrease vehicle speed when said fluid pressure decreases below a certain value comprising a casing adapted to be mounted on the vehicle containing a fluid tight pressure chamber and a spring chamber containing spring means, said chambers being separated by member displaceable in response to pressure changes in said fluid pressure chamber, a conduit connection between said fluid pressure chamber and said source, a mechanical linkage connected between said member and said actuator shaft comprising an actuating lever secured to said actuator shaft and a flexible cable slidably mounted on a bracket rigid with said motor support, said cable being operatively connected at one end to said member and having a slide connection with said lever at its opposite end, said arrangement being such that when said source fluid pressure exceeds said certain value said member holds said spring means compressed and said mechanical linkage inoperable but when said source fluid pressure falls below said value said compressed spring means expands to pull said cable to actuate said linkage to rotate said actuator shaft to apply said service brake mechanism, said slide connection of said cable to said lever comprising a fitting on the cable slidable in an aperture in said lever and an abutment on the cable end drawn tight with the lever when the cable is pulled to brake applied condition, and manual means for displacing said abutment to slacken the cable and release the automatically applied brakes for removal of the stopped vehicle to a place of safety and repair.

2. In an automatic safety braking system for a vehicle equipped with a source of fluid under pressure connected to fluid pressure responsive service brake mechanism at vehicle wheels and driver-operated means for controlling said service brakes during normal vehicle operation, independent means for automatic control of said service brakes in the event of a predetermined drop in said fluid pressure comprising an enclosed fluid pressure responsive device connected to said source by a conduit and connected to said mechanism by a mechanical linkage, said mechanical linkage comprising a flexible conduit sheathing and an operating cable passing through said sheathing, said sheathing being secured at one end adjacent said enclosed fluid pressure responsive device and at its other end adjacent said service brake mechanism, and said cable being connected to said service brake mechanism, said brake mechanism comprising an actuating lever and said cable having at one end a slide connection to said lever, spring means within said device, a pressure responsive member within said device in operative engagement with said spring means and connected to the other end of said cable, means defining a fluid pressure chamber in said device connected to said fluid pressure source and operable to maintain said spring means compressed and urge said pressure responsive member and cable in brake release direction as long as said source pressure applied thereto exceeds a predetermined value, said spring means expanding upon decrease of said pressure to pull said cable to actuate said lever to apply the vehicle brake mechanism, and said slide connection of the cable to the lever comprising a fitting on the cable slidable in an aperture in the lever and an abutment on the cable end drawn tight with the lever when the cable is pulled to brake applied condition, and manual means for displacing said abutment to slacken the cable and release the automatically applied brakes for removal of the stopper vehicle to a place of safety and repair.

References Cited in the file of this patent

UNITED STATES PATENTS

| | | |
|---|---|---|
| 1,997,807 | Bird | Apr. 16, 1935 |
| 2,048,398 | Lasker | July 21, 1936 |
| 2,192,548 | Gunderson | Mar. 5, 1940 |
| 2,373,259 | Price | Apr. 10, 1945 |
| 2,409,908 | Simpkins | Oct. 22, 1946 |
| 2,645,313 | Schaadt | July 14, 1953 |
| 2,762,615 | Cedarholm | Sept. 11, 1956 |
| 2,848,980 | Ayers | Aug. 26, 1958 |
| 2,852,316 | Staley | Sept. 16, 1958 |
| 2,854,954 | Howze | Oct. 7, 1958 |
| 2,886,143 | Neff et al. | May 12, 1959 |
| 2,976,085 | Grogan | Mar. 21, 1961 |